(12) United States Patent
Yu et al.

(10) Patent No.: US 11,398,046 B2
(45) Date of Patent: Jul. 26, 2022

(54) OBJECT POSITION DETERMINATION CIRCUIT

(71) Applicant: Realtek Semiconductor Corp., HsinChu (TW)

(72) Inventors: Teng-Hsiang Yu, New Taipei (TW); Chun-Hsing Hsieh, Hsinchu (TW); Yen-Lin Chen, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 27 days.

(21) Appl. No.: 16/544,869

(22) Filed: Aug. 19, 2019

(65) Prior Publication Data

US 2020/0211214 A1 Jul. 2, 2020

(30) Foreign Application Priority Data

Jan. 2, 2019 (TW) ................................ 108100055

(51) Int. Cl.
*G06K 9/00* (2022.01)
*G06T 7/70* (2017.01)
(Continued)

(52) U.S. Cl.
CPC .................. *G06T 7/70* (2017.01); *G06F 3/14* (2013.01); *G06T 7/60* (2013.01); *G06T 2207/30201* (2013.01)

(58) Field of Classification Search
CPC ................. G06T 7/70; G06T 7/60; G06F 3/14
(Continued)

(56) References Cited

U.S. PATENT DOCUMENTS

2006/0257048 A1* 11/2006 Lin .................... G06K 9/00711
382/276
2007/0070201 A1* 3/2007 Yokomitsu .............. G06T 7/246
348/169
(Continued)

FOREIGN PATENT DOCUMENTS

WO 2015/087820 A1 6/2015

OTHER PUBLICATIONS

Simone Frintrop et al., Most Salient Region Tracking, 2009 IEEE International Conference on Robotics and Automation, Kobe International Conference Center, Kobe, May 12-17, 2009, pp. 1869-1874, Japan, XP031509532.
(Continued)

*Primary Examiner* — Stephen P Coleman
(74) *Attorney, Agent, or Firm* — Winston Hsu

(57) ABSTRACT

The present invention provides an object position determination circuit including a receiving circuit and a detecting circuit. In operations of the object position determination circuit, the receiving circuit receives an image signal; and the detecting circuit detects a position of an object in an $N^{th}$ frame of the image signal, determines a partial region within an $(N+M)^{th}$ frame of the image signal according to the position of the object in the $N^{th}$ frame, and only detects the partial region within the $(N+M)^{th}$ frame to determine a position of the object in the $(N+M)^{th}$ frame, wherein N and M are positive integers.

12 Claims, 7 Drawing Sheets

(51) Int. Cl.
*G06F 3/14* (2006.01)
*G06T 7/60* (2017.01)

(58) Field of Classification Search
USPC .......................................................... 382/103
See application file for complete search history.

(56) References Cited

U.S. PATENT DOCUMENTS

| | | | |
|---|---|---|---|
| 2009/0129629 A1* | 5/2009 | Cheng | G06V 40/162 |
| | | | 382/103 |
| 2013/0070105 A1 | 3/2013 | Ike | |
| 2014/0247374 A1* | 9/2014 | Murakami | H04N 5/23218 |
| | | | 348/222.1 |
| 2014/0314274 A1* | 10/2014 | Kempinski | G06T 7/20 |
| | | | 382/103 |
| 2015/0049063 A1* | 2/2015 | Smith | G06F 3/0421 |
| | | | 345/175 |
| 2015/0086073 A1 | 3/2015 | Yang | |
| 2016/0005211 A1* | 1/2016 | Sarkis | G06T 1/0007 |
| | | | 345/419 |
| 2016/0260226 A1 | 9/2016 | Yano | |
| 2017/0257573 A1* | 9/2017 | Abe | G06T 7/97 |
| 2019/0103026 A1* | 4/2019 | Liu | G06K 9/3233 |

OTHER PUBLICATIONS

Joseph Redmon et al., You Only Look Once: Unified, Real-Time Object Detection, May 9, 2016, pp. 1-10, http://pjreddie.com/yolo/, XP055556774.

\* cited by examiner

OBJECT POSITION DETERMINATION CIRCUIT

BACKGROUND OF THE INVENTION

1. Field of the Invention

The present invention is related to image processing, and more particularly, to a circuit for determining a position of a specific object in an image.

2. Description of the Prior Art

In current face identification systems, deep learning or neural networks are utilized to analyze and process an image in order to identify a position of a human face therein. An artificial intelligence module for deep learning requires a high computation amount. When there is a large content of image data, the artificial intelligence module may be overloaded, therefore requiring an artificial intelligence module having greater ability. This increases design and manufacturing costs.

SUMMARY OF THE INVENTION

Thus, an objective of the present invention is to provide an object position determination circuit, which can perform object position detection on a partial region of subsequent frame(s) according to a detection result of previous frame(s) only, to reduce loading of the artificial intelligence module.

In an embodiment of the present invention, an object position determination circuit is disclosed. The object position determination circuit comprises a receiving circuit and a detecting circuit. In operations of the object position determination circuit, the receiving circuit receives an image signal; and the detecting circuit detects a position of an object in an $N^{th}$ frame of the image signal, determines a partial region within an $(N+M)^{th}$ frame of the image signal according to the position of the object in the $N^{th}$ frame, and only detects the partial region within the $(N+M)^{th}$ frame to determine a position of the object in the $(N+M)^{th}$ frame, wherein N and M are positive integers.

In another embodiment of the present invention, a circuit architecture comprising an object position determination circuit and an image processing circuit is disclosed. The object position determination circuit comprises a receiving circuit, a detecting circuit, and an output circuit, wherein the receiving circuit receives an image signal; the detecting circuit detects a position of an object in an $N^{th}$ frame of the image signal, determines a partial region within an $(N+M)^{th}$ frame of the image signal according to the position of the object in the $N^{th}$ frame, and only detects the partial region within the $(N+M)^{th}$ frame to determine a position of the object in the $(N+M)^{th}$ frame, wherein N and M are positive integers; and the output circuit outputs coordinate ranges within the $N^{th}$ frame and the $(N+M)^{th}$ frame to respectively serve as the positions of the object. The image processing circuit is configured to receive the image signal and process the image signal according to the coordinate ranges within the $N^{th}$ frame and the $(N+M)^{th}$ frame, in order to generate multiple output images to a display panel for being displayed thereon.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
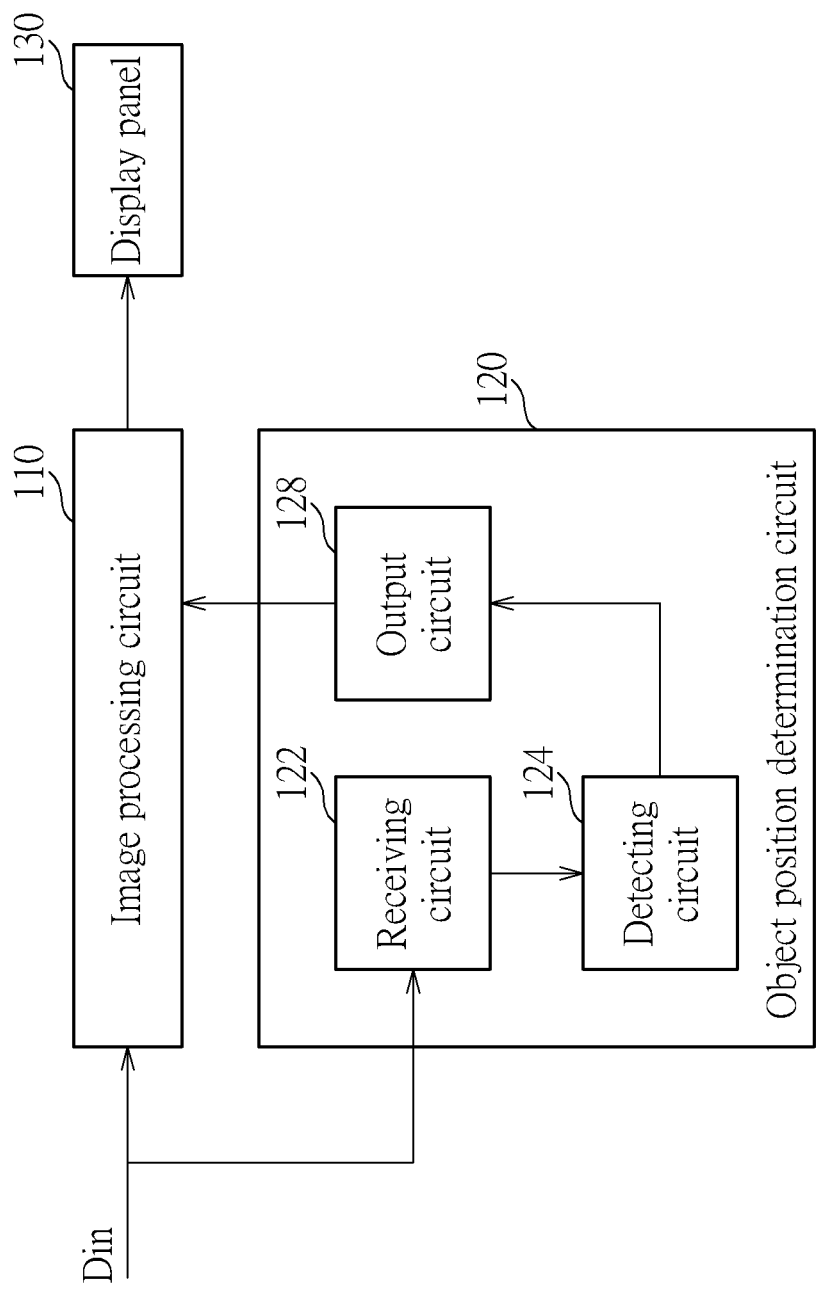
FIG. 1 is a diagram illustrating an electronic device according to an embodiment of the present invention.

FIG. 1 is a diagram illustrating an electronic device according to an embodiment of the present invention. As shown in FIG. 1, the electronic device comprises an image processing circuit 110, an object position determination circuit 120 and a display panel 130, where the object position determination circuit 120 comprises a receiving circuit 122, a detecting circuit 124 and an output circuit 128. In this embodiment, the image processing circuit 110 and the object position determination circuit 120 may be integrated into a single chip, and the electronic device may be any electronic device comprising a display panel, such as a desktop computer, laptop computer, or mobile phone, etc.

In operations of the electronic device, the image processing circuit 110 is configured to receive an image signal Din, and generate multiple output images (frames) to the display panel 130 for being displayed thereon. Simultaneously, the object position determination circuit 120 determines positions of an object (e.g. a human face) in multiple frames according to contents of the image signal Din, and generates object position information (e.g. region coordinates of the object in each frame) to the image processing circuit, to allow the image processing circuit to process the image signal Din. Determination (or detection) of object position in an image is performed by utilizing deep learning or neural networks which require a high computation amount, and processing capability of the object position determination circuit 120 is not enough to perform the determination (or detection) of object position on each frame immediately; for example, the time for the object position determination circuit 120 to process a whole frame might be equal to the time for the display panel 130 to display four to five frames. Thus, the object position determination circuit 120 in this embodiment performs object position detection according to a partial region of a frame, in order to provide the image processing circuit with enough object position information under a condition where the processing capability of the object position determination circuit 120 meets the requirement.

Figure 2:
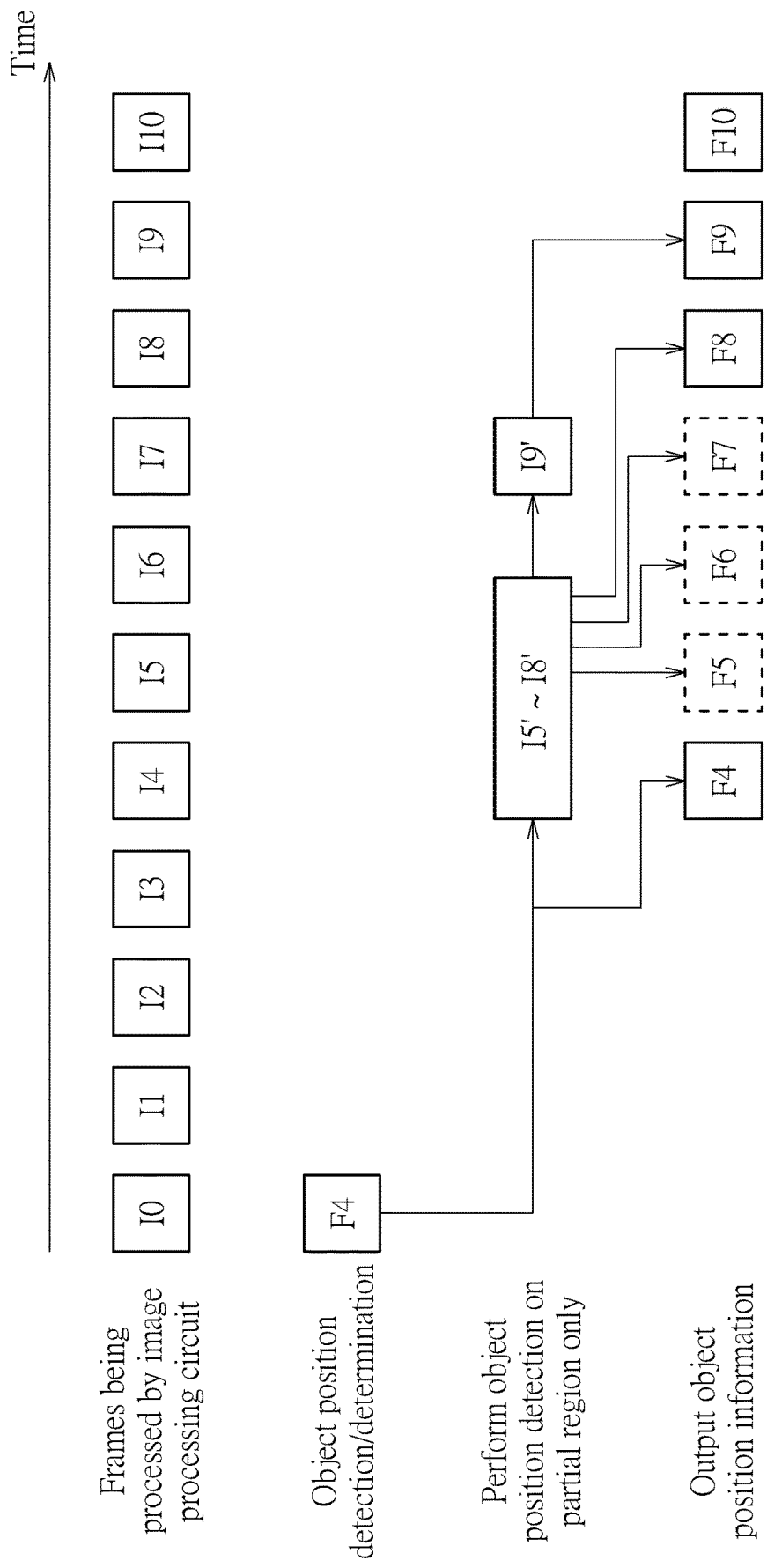
FIG. 2 is a timing diagram illustrating operations of an object position determination circuit according to an embodiment of the present invention.

Refer to FIG. 1 and FIG. 2 together, where FIG. 2 is a timing diagram illustrating operations of the object position determination circuit 120 according to an embodiment of the present invention. As shown in FIG. 2, this embodiment assumes that the time for the object position determination circuit 120 to process a whole frame is roughly equal to the time for the display panel to display four to five frames.

Thus, during a process of the image processing circuit 110 receiving frames I0 to I3 and performing further processing on them, the detecting circuit 124 skips the frames I1 to I3 and directly performs object position detection on whole contents of a frame I4 in order to determine a position of the object in the frame I4 and output a coordinate range which serves as position information F4 of the object in the frame I4. Then, a partial region of at least one of the frames I5 to I8 is determined according to the position information F4 (i.e. the coordinate range mentioned above) of the object in the frame I4, and the detecting circuit 124 only detects the partial region to determine a position of the object in at least one of the frames I5 to I8. In this embodiment, the detecting circuit 124 at least generates position information F8 of the object in the frame I8, and the detecting circuit 124 then determines a partial region I9' of a frame I9 according to the position information F8 of the object in the frame I8, where the detecting circuit 124 only detects the partial region I9' to determine a position of the object in the frame I9.

Figure 3:
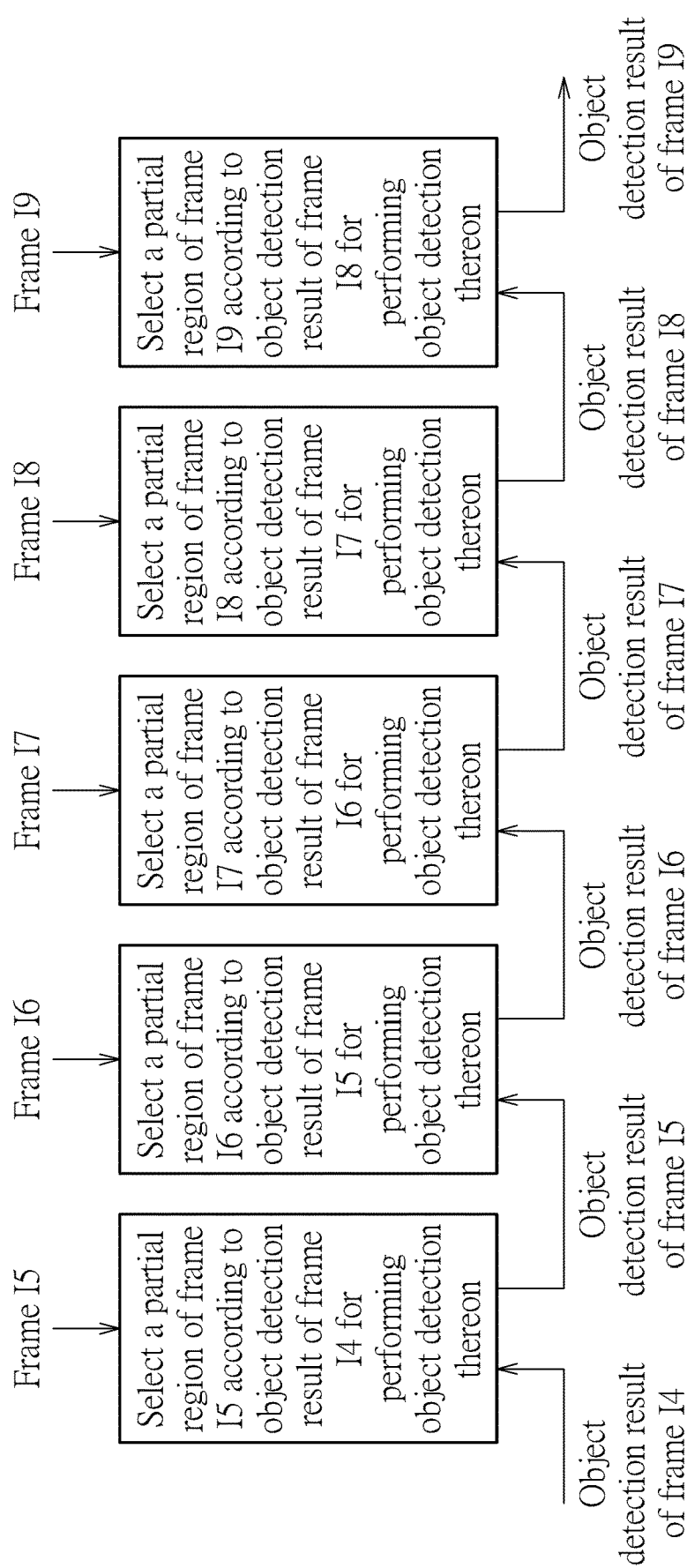
FIG. 3 is a diagram illustrating object detection operations according to a first embodiment of the present invention.

In this embodiment, the detecting circuit 124 may determine whether to perform object detection on at least one of the frames I5 to I7 or directly skip (or omit) the frames I5 to I7 according to a size or an occupied ratio of the object in the frame I4. For example, referring to a first embodiment shown in FIG. 3 and assuming that the size or occupied ratio of the object in the frame I4 is less than a threshold value, the detecting circuit 124 performs object detection on each of the frames I5 to I8 to generate object position information. In detail, the detecting circuit 124 may select a partial region I5' of the frame I5 according to an object detection result of the frame I4 (the position information F4) for performing object detection thereon (other regions do not undergo object detection), select a partial region I6' of the frame I6 according to an object detection result of the frame I5 (the position information F5) for performing object detection thereon (other regions do not undergo object detection), select a partial region I7' of the frame I7 according to an object detection result of the frame I6 (the position information F6) for performing object detection thereon (other regions do not undergo object detection), select a partial region I8' of the frame I8 according to an object detection result of the frame I7 (the position information F7) for performing object detection thereon (other regions do not undergo object detection), and select a partial region I9' of the frame I9 according to an object detection result of the frame I8 (the position information F8) for performing object detection thereon (other regions do not undergo object detection), where the rest may be deduced by analogy. In this embodiment, considering movement of the object, a size of the partial region of each of the frames I6, I7, I8 and I9 that is selected and undergoes object detection is not less than a size of a previous frame that is selected and undergoes object detection; for example, each of the frames I5 to I8 may select a region having 10% size of a frame to perform object detection thereon, and the frame I9 may select a region having 50% size of a frame to perform object detection thereon.

Figure 4:
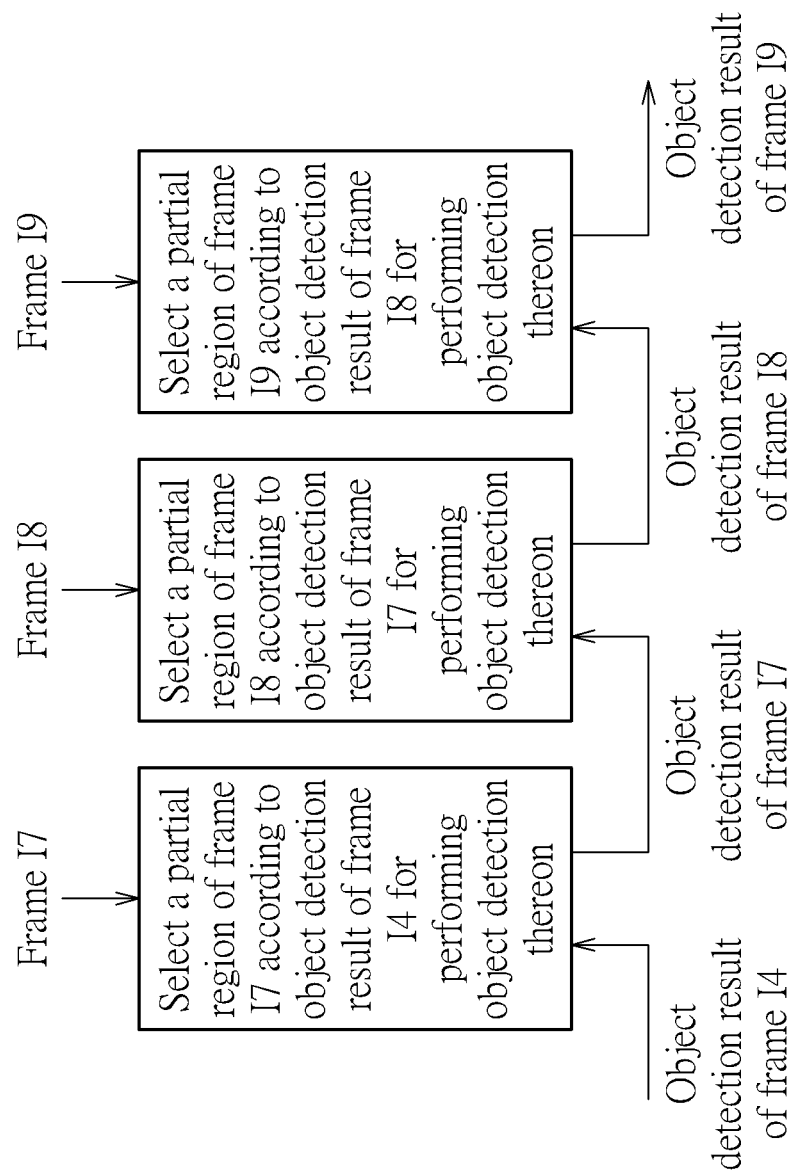
FIG. 4 is a diagram illustrating object detection operations according to a second embodiment of the present invention.

Referring to a second embodiment shown in FIG. 4 and assuming that the size or occupied ratio of the object in the frame I4 is greater than a threshold value, the detecting circuit 124 may only perform object detection on the frames I7 and I8 to generate the position information F7 and F8, and does not perform object detection on the frames I5 and I6. In detail, the detecting circuit 124 may select a partial region I7' of the frame I7 for performing object detection thereon (other regions do not undergo object detection) according to the object detection result of the frame I4 (the position information F4), select a partial region I8' of the frame I8 for performing object detection thereon (other regions do not undergo object detection) according to the object detection result of the frame I7 (the position information F7), and select a partial region I9' of the frame I9 for performing object detection thereon (other regions do not undergo object detection) according to the object detection result of the frame I8 (the position information F8), where the rest may be deduced by analogy. In this embodiment, considering the movement of the object, a size of the partial region of each of the frames I8 and I9 that is selected and undergoes object detection is not less than a size of a previous frame that is selected and undergoes object detection; for example, each of the frames I7 and I8 may select a region having 20% size of a frame to perform object detection thereon, and the frame I9 may select a region having 50% size of a frame to perform object detection thereon.

Figure 5:
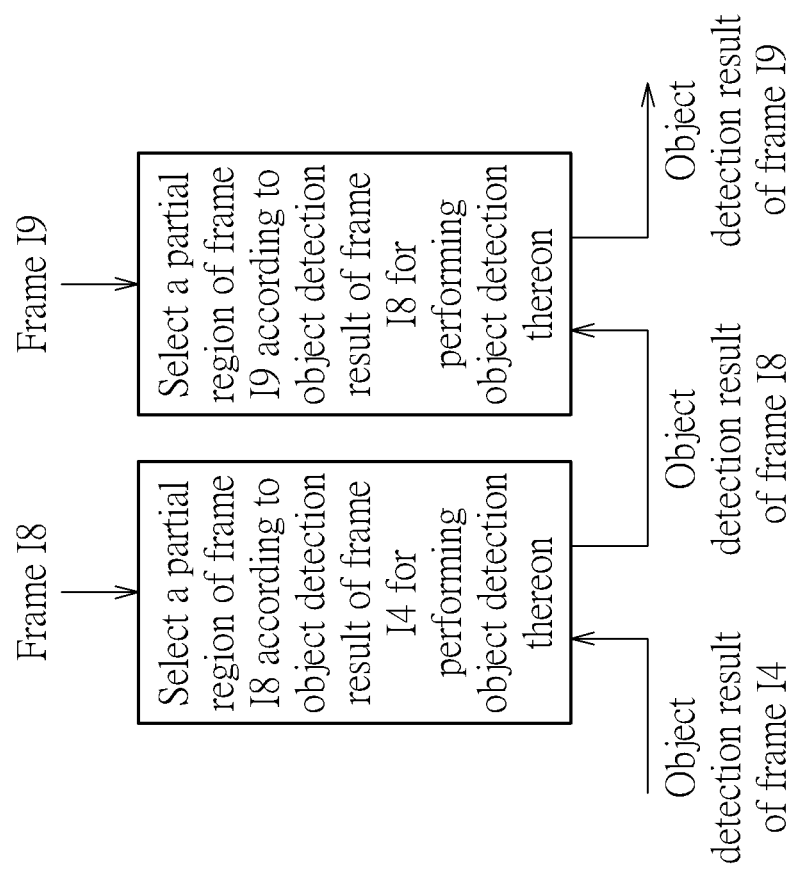
FIG. 5 is a diagram illustrating object detection operations according to a third embodiment of the present invention.

Referring to a third embodiment shown in FIG. 5 and assuming that the size or occupied ratio of the object in the frame I4 is too big or too high, the detecting circuit 124 may perform object detection only on the frame I8 to generate the position information F8, and object detection is not performed on the frames I5 to I7. In detail, the detecting circuit 124 may select a partial region I8' of the frame I8 for performing object detection thereon (other regions do not undergo object detection) according to the object detection result of the frame I4 (the position information F4), and select a partial region of the frame I9 for performing object detection thereon (other regions do not undergo object detection) according to the object detection result of the frame I8 (the position information F8), where the rest may be deduced by analogy. In this embodiment, considering the movement of the object, the partial region which is selected from the frame I9 and undergoes object detection is not less than the region selected from the previous frame which undergoes object detection; for example, a region having 40% size of a frame can be selected from the frame I8 for undergoing object detection, and a region having 50% size of a frame can be selected from the frame I9 for undergoing object detection.

Operations of the detecting circuit 124 performing object detection on frames I10 to I14 are similar to those performed on frames I5 to I9; that is, a partial region of at least one of the frames I10 to I13 is determined according to the position information F9 of the object in the frame I9, and the detecting circuit 124 only detects the partial region to determine a position of the object in at least one of the frames I10 to I13. In this embodiment, the detecting circuit 124 at least generates position information of the object in the frame I13, and the detecting circuit 124 then determines a partial region of the frame I14 according to the position information of the object in the frame I13, and the detecting circuit 124 only detects the partial region to determine a position of the object in the frame I14, where the rest may be deduced by analogy.

Returning to FIG. 2, the frames I0 to I10 are sequentially processed by the image processing circuit 110 and the transmitted to the display panel 130 for being displayed. Thus, the object position determination circuit 120 may perform object detection on the frame I4 while the image processing circuit 110 processes the frame I0, and temporarily store the position information F4 of the object in the frame I4. The object position determination circuit 120 sequentially performs object detection on the frames I5 to I8 while the image processing circuit 110 processes the frame I4, to transmit the position information F5 to F8 of the object in the frames I5 to I8 to the image processing circuit 110, so that the image processing circuit 110 processes images according to the above position information (such as the position information F5 to F8). Additionally, considering the movement of the object, a greater region may be selected from the frame I9 for undergoing object detection, so that the object position determination circuit 120 may perform object position detection on a partial region I9' of the frame I9 while the image processing circuit 110 processes the frame I7, and transmit the position information F9 of the object in the frame I9 to the image processing circuit 110 for being processed.

As mentioned in the above embodiments, since only a partial region needs to undergo object detection, the detecting circuit 124 may perform object detection or determination on each frame or most frames under a condition where calculation capability of deep learning or neural network can meet requirements, to finish the object detection operations more efficiently.

Figure 6:
FIG. 6 is a diagram illustrating an image processing circuit processing images according to object position information.
Figure 6:
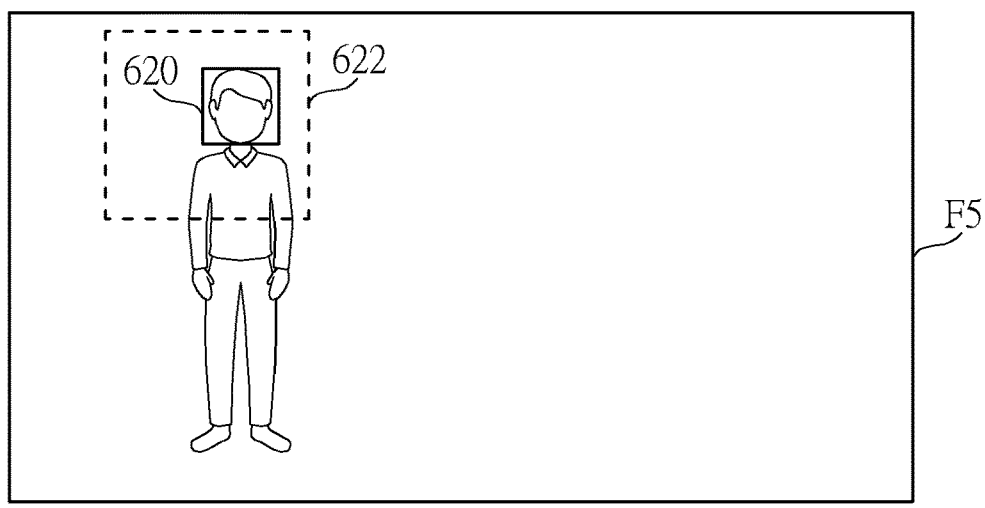
Figure 6:
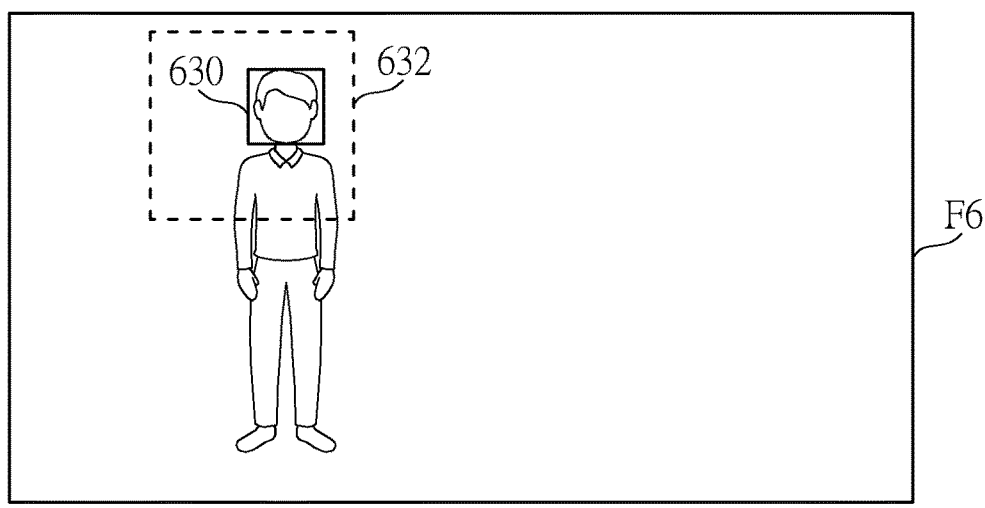

In an embodiment, the image processing circuit 110 may add a pattern on a frame according to object position information from the object position determination circuit 120 in order to label the object. Taking FIG. 6 as an example and assuming that the detected object is a human face, the object position determination circuit 120 transmits an object detection result (i.e. a coordinate range 610 shown in FIG. 6) of the frame I4 to the image processing circuit 110 to serve as the position information of the object, and the image processing circuit 110 adds a rectangle on the frame I4 to label a position of the object. Then, the object position determination circuit 120 selects a region 622 from the frame I5 for object detection according to the coordinate range 610, where the region 622 includes the coordinate range 610, and the region 622 and the coordinate range 610 have a same center position (center coordinate) in an embodiment. The object position determination circuit 120 then transmits an object detection result (i.e. a coordinate range 620 shown in FIG. 6) of the frame I5 to the image processing circuit 110 to serve as the position information of the object, and the image processing circuit 110 adds a rectangle on the frame I5 to label a position of the object. Then, the object position determination circuit 120 selects a region 632 from the frame I6 for object detection according to the coordinate range 620, where the region 632 includes the coordinate range 620, and the region 632 and the coordinate range 620 have a same center position (center coordinate) in an embodiment. The object position determination circuit 120 then transmits an object detection result (i.e. a coordinate range 630 shown in FIG. 6) of the frame I6 to the image processing circuit 110 to serve as the position information of the object, and the image processing circuit 110 adds a rectangle on the frame I6 to label a position of the object.

In another embodiment, the image processing circuit 110 may perform image processing on different regions within a frame in different manners according to the object position information from the object position determination circuit 120. Taking FIG. 6 as an example, regarding the frame I4, the image processing circuit 120 may process a human face portion within the region 610 in a first image processing manner (e.g. a contrast ratio, color modification, etc.), and process other portions outside the region 610 in a second image processing manner. Regarding the frames I5 and I6, the image processing circuit 110 may process a human face portion within the regions 620 and 630 in a first image processing manner (e.g. a contrast ratio, color modification, etc.), and process the portions outside the regions 620 and 630 in a second image processing manner.

Figure 7:
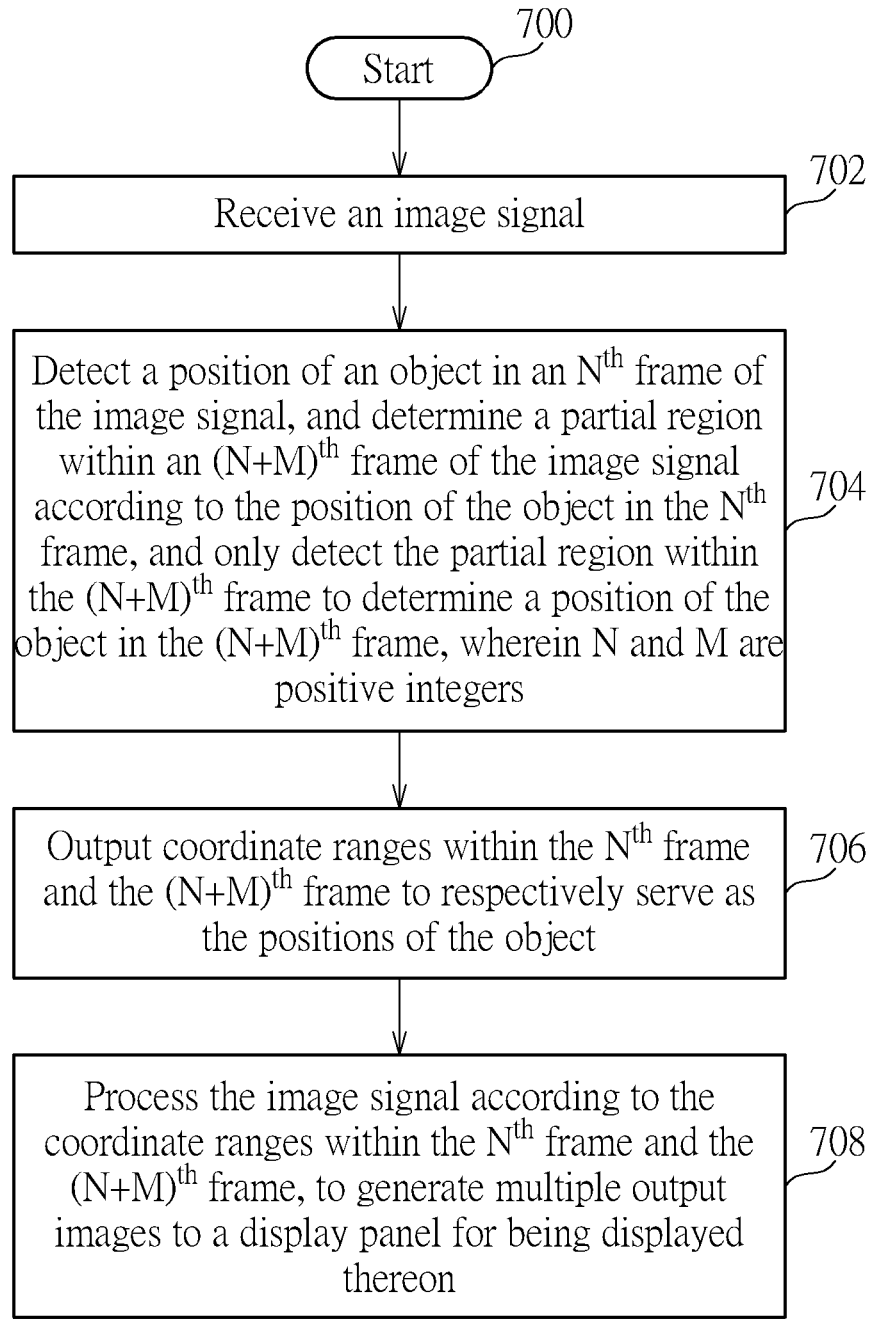
FIG. 7 is a flowchart illustrating an image processing method according to an embodiment of the present invention.

FIG. 7 is a flowchart illustrating an image processing method according to an embodiment of the present invention. Referring to all descriptions disclosed above, the image processing method is shown as follows.

Step 700: the flow starts.

Step 702: receive an image signal.

Step 704: detect a position of an object in an $N^{th}$ frame of the image signal, and determine a partial region within an $(N+M)^{th}$ frame of the image signal according to the position of the object in the $N^{th}$ frame, and only detect the partial region within the $(N+M)^{th}$ frame to determine a position of the object in the $(N+M)^{th}$ frame, wherein N and M are positive integers.

Step 706: output coordinate ranges within the $N^{th}$ frame and the $(N+M)^{th}$ frame to respectively serve as the positions of the object.

Step 708: process the image signal according to the coordinate ranges within the $N^{th}$ frame and the $(N+M)^{th}$ frame, to generate multiple output images to a display panel for being displayed thereon.

Briefly summarized, in the circuit and image processing method of the present invention, by performing object detection on a partial region of a frame only, a detection circuit can perform object detection or determination on each frame or most frames under a condition where calculation capability of deep learning or neural network can meet requirements, so that object detection operations can be finished more efficiently and loading of circuits for image identification can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object position determination circuit, comprising:
a receiving circuit, configured to receive an image signal; and
a detecting circuit, coupled to the receiving circuit, configured to detect a position of an object in an $N^{th}$ frame of the image signal, and determine a size or an occupied ratio of the object in the $N^{th}$ frame;
wherein in response to the size or the occupied ratio of the object in the $N^{th}$ frame being less than a threshold value, the detecting circuit performs object detection on each of $(N+1)^{th}$ $(N+M)^{th}$ frames; and in response to the size or the occupied ratio of the object in the $N^{th}$ frame being greater than the threshold value, the detecting circuit performs object detection on the $(N+M)^{th}$ frame, but the detecting circuit does not perform the object detection on the $(N+1)^{th}$ frame;
wherein the detecting circuit determines a partial region within the $(N+M)^{th}$ frame of the image signal according to the position of the object in the $N^{th}$ frame, and only detect the partial region within the $(N+M)^{th}$ frame to determine a position of the object in the $(N+M)^{th}$ frame, wherein N and M are positive integers, and M is greater than one.

2. The object position determination circuit of claim 1, wherein M is equal to two, three or four.

3. The object position determination circuit of claim 1, wherein the detecting circuit determines a partial region within an $(N+M+K)^{th}$ frame of the image signal according to the position of the object in the $(N+M)^{th}$ frame, and only detects the partial region within the $(N+M+K)^{th}$ frame to determine a position of the object in the $(N+M+K)^{th}$ frame, wherein K is a positive integer.

4. The object position determination circuit of claim 3, wherein the partial region within the $(N+M+K)^{th}$ frame is not less than the partial region within the $(N+M)^{th}$ frame.

5. The object position determination circuit of claim 3, wherein the partial region within the $(N+M+K)^{th}$ frame is greater than the partial region within the $(N+M)^{th}$ frame.

6. A circuit, comprising:
 an object position determination circuit, comprising:
  a receiving circuit, configured to receive an image signal;
  a detecting circuit, coupled to the receiving circuit, configured to detect a position of an object in an $N^{th}$ frame of the image signal, and determine a size or an occupied ratio of the object in the $N^{th}$ frame; and in response to the size or the occupied ratio of the object in the $N^{th}$ frame being less than a threshold value, the detecting circuit performs object detection on each of $(N+1)^{th}$-$(N+M)^{th}$ frames; and in response to the size or the occupied ratio of the object in the $N^{th}$ frame being greater than the threshold value, the detecting circuit performs object detection on the $(N+M)^{th}$ frame, but the detecting circuit does not perform the object detection on the $(N+1)^{th}$ frame; the detecting circuit determines a partial region within the $(N+M)^{th}$ frame of the image signal according to the position of the object in the $N^{th}$ frame, and only detect the partial region within the $(N+M)^{th}$ frame to determine a position of the object in the $(N+M)^{th}$ frame, wherein N and M are positive integers, and M is greater than one; and
  an output circuit, configured to respectively output coordinate ranges within the $N^{th}$ frame and the $(N+M)^{th}$ frame to serve as the positions of the object; and
 an image processing circuit, coupled to the object position determination circuit, configured to receive the image signal and process the image signal according to the coordinate ranges within the $N^{th}$ frame and the $(N+M)^{th}$ frame, to generate multiple output images to a display panel for being displayed thereon.

7. The circuit of claim 6, wherein the image processing circuit adds a pattern on the $N^{th}$ frame according to the coordinate range within the $N^{th}$ frame in order to label the object, and adds the pattern of the $(N+M)^{th}$ frame according to the coordinate range within the $(N+M)^{th}$ frame in order to label the object for generating the output image to the display panel for being displayed thereon.

8. The circuit of claim 6, wherein the image processing circuit processes a region within the coordinate range within the $N^{th}$ frame in a manner different from other regions outside the coordinate range within the $N^{th}$ frame, and processes a region within the coordinate range within the $(N+M)^{th}$ frame in a manner different from other regions outside the coordinate range within the $(N+M)^{th}$ frame for generating the output signal to the display panel for being displayed thereon.

9. The circuit of claim 6, wherein M is equal to two, three or four.

10. The circuit of claim 6, wherein the detecting circuit determines a partial region within an $(N+M+K)^{th}$ frame of the image signal according to the position of the object in the $(N+M)^{th}$ frame, and only detects the partial region within the $(N+M+K)^{th}$ frame to determine a position of the object in the $(N+M+K)^{th}$ frame, wherein K is a positive integer.

11. The circuit of claim 10, wherein the partial region within the $(N+M+K)^{th}$ frame is not less than the partial region within the $(N+M)^{th}$ frame.

12. The circuit of claim 11, wherein the partial region within the $(N+M+K)^{th}$ frame is greater than the partial region within the $(N+M)^{th}$ frame.

\* \* \* \* \*